United States Patent
Yanoto

(10) Patent No.: US 10,125,730 B2
(45) Date of Patent: Nov. 13, 2018

(54) FUEL INJECTION CONTROL DEVICE FOR INTERNAL COMBUSTION ENGINE

(71) Applicant: DENSO CORPORATION, Kariya, Aichi-pref. (JP)

(72) Inventor: Keisuke Yanoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/568,248

(22) PCT Filed: Mar. 30, 2016

(86) PCT No.: PCT/JP2016/001829
§ 371 (c)(1),
(2) Date: Oct. 20, 2017

(87) PCT Pub. No.: WO2016/170738
PCT Pub. Date: Oct. 27, 2016

(65) Prior Publication Data
US 2018/0149124 A1    May 31, 2018

(30) Foreign Application Priority Data

Apr. 24, 2015   (JP) .................. 2015-089305

(51) Int. Cl.
*F02M 51/06* (2006.01)
*F02D 41/14* (2006.01)
(Continued)

(52) U.S. Cl.
CPC ....... *F02M 51/061* (2013.01); *F02D 41/1401* (2013.01); *F02D 41/20* (2013.01); *F02D 41/247* (2013.01); *F02D 41/2425* (2013.01); *F02D 41/40* (2013.01); *F02D 2041/1432* (2013.01); *F02D 2041/2048* (2013.01); *F02D 2041/389* (2013.01); *F02D 2200/063* (2013.01); *Y02T 10/44* (2013.01)

(58) Field of Classification Search
CPC .............. F02M 51/061; F02D 41/1401; F02D 41/2425; F02D 2041/1432
USPC ....................................................... 123/490
See application file for complete search history.

(56) References Cited

U.S. PATENT DOCUMENTS

| | | |
|---|---|---|
| 5,861,746 A | 1/1999 | Ensten |
| 2003/0071613 A1 | 4/2003 | Schultz et al. |

(Continued)

FOREIGN PATENT DOCUMENTS

JP    2006-342692    12/2006

OTHER PUBLICATIONS

International Search Report for PCT/JP2016/001829, dated Jun. 21, 2016, 4 pages.

*Primary Examiner* — Mahmoud Gimie
(74) *Attorney, Agent, or Firm* — Nixon & Vanderhye PC

(57) ABSTRACT

An ECU as a fuel injection control device includes: an injector control part that energizes a magnetic circuit of a fuel injector by a specified injection pulse to thereby open the fuel injector and that energizes the magnetic circuit by a specified energization pulse within a range in which a needle valve of the fuel injector is not driven; and a storage part that stores information relating to a behavior of a drive voltage (minus terminal voltage) of the fuel injector when the magnetic circuit is energized by the injector control part by the specified energization pulse.

19 Claims, 13 Drawing Sheets

(51) Int. Cl.
  *F02D 41/20* (2006.01)
  *F02D 41/24* (2006.01)
  *F02D 41/40* (2006.01)
  *F02D 41/38* (2006.01)

(56) References Cited

U.S. PATENT DOCUMENTS

| | | |
|---|---|---|
| 2014/0285986 A1 | 9/2014 | Sano |
| 2015/0144109 A1* | 5/2015 | Mukaihara .......... F02D 41/2467 |
| | | 123/490 |
| 2016/0076498 A1 | 3/2016 | Aono et al. |
| 2016/0237937 A1* | 8/2016 | Kusakabe ............... F02D 41/20 |

* cited by examiner

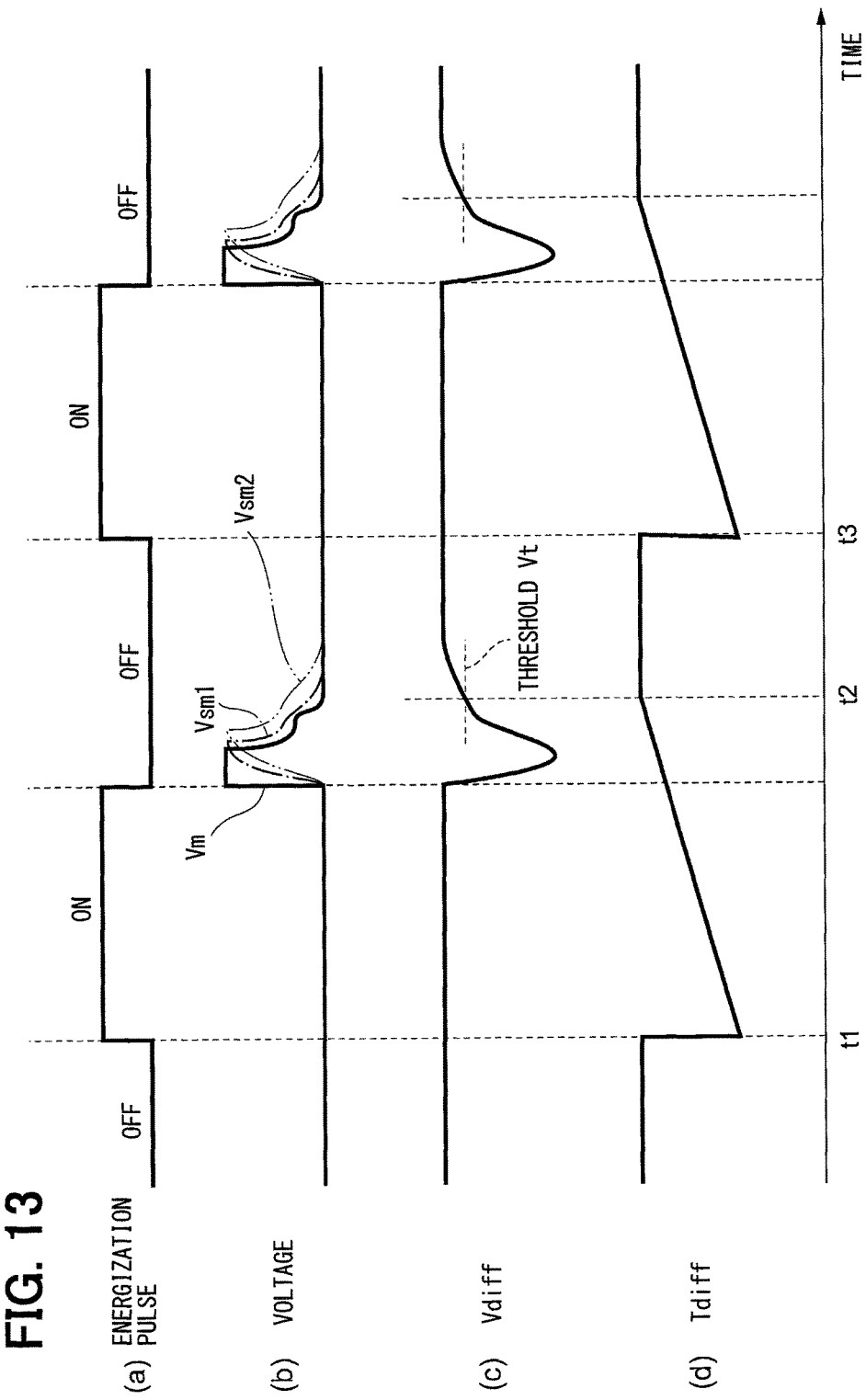

FUEL INJECTION CONTROL DEVICE FOR INTERNAL COMBUSTION ENGINE

CROSS REFERENCE TO RELATED APPLICATIONS

This application is the U.S. national phase of International Application No. PCT/JP2016/001829 filed Mar. 30, 2016, which designated the U.S. and claims priority to Japanese Patent Application No. 2015-89305 filed on Apr. 24, 2015, the entire contents of each of which are hereby incorporated herein by reference.

TECHNICAL FIELD

The present disclosure relates to a fuel injection control device for an internal combustion engine.

BACKGROUND ART

In general, a fuel injection control system of an internal combustion engine includes a fuel injector of an electromagnetic drive type and calculates a required injection amount according to an operating state of the internal combustion engine and opens the fuel injector by an injection pulse of a pulse width corresponding to the required injection amount.

However, in the fuel injector of the internal combustion engine of a direct injection type which injects fuel of high pressure into a cylinder, linearity of a change characteristic of an actual injection amount with respect to an injection pulse width tends to become worse in a partial lift range (range in which an injection pulse width is short and hence in which a lift amount of a valve body is brought into a partial lift state in which the lift amount does not reach a full lift position). In this partial lift range, variations in the lift amount of the valve body (for example, a needle valve, an armature) tend to become large and variations in an injection amount tend to become large. When the variations in the injection amount become large, an exhaust emission and drivability is likely to become worse.

As to a technique relating to correction of the variations in the injection amount of the fuel injector, there is proposed a technique that detects a behavior of an armature of a solenoid on the basis of a behavior of a drive voltage (for example, a minus terminal voltage) of the fuel injector, for example, as disclosed in a patent literature 1, a technique that compares a drive voltage of a solenoid with a reference voltage obtained by filtering the drive voltage by a low-pass filter to thereby detect a position of an armature of the solenoid on the basis of an intersection of both of them. In this technique, variations in the lift amount of the valve body of the fuel injector are estimated on the basis of the detected behavior of the armature and variations in the injection amount are corrected.

However, it is general that the behavior of the drive voltage of the fuel injector is affected by an individual difference of a magnetic circuit of the fuel injector and hence that variations are caused in the behavior of the drive voltage between the individual magnetic circuits. In order to improve detection accuracy of the behavior of the armature of the solenoid (that is, a behavior of the valve body of the fuel injector) on the basis of the behavior of the drive voltage, it is desirable that a degree of variation in the behavior of the drive voltage, which is affected by the individual difference of the magnetic circuit of the fuel injector, can be detected with high accuracy.

PRIOR ART LITERATURE

Patent Literature

Patent Literature 1: US 2003-0071613 A

SUMMARY OF INVENTION

It is an object of the present disclosure to provide a fuel injection control device for an internal combustion engine that can detect a degree of variation in a behavior of a drive voltage, which is affected by an individual difference of a magnetic circuit of a fuel injector, with high accuracy.

A fuel injection control device according to the present disclosure, in a fuel injection control device of an internal combustion engine provided with a fuel injector of an electromagnetic drive type, the fuel injection control device includes: a control part that energizes a magnetic circuit of the fuel injector by a specified injection pulse to thereby open the fuel injector and that energizes the magnetic circuit by a specified energization pulse within a range in which a valve body of the fuel injector is not driven; and a storage part that stores information relating to a behavior of a drive voltage of the fuel injector when the magnetic circuit is energized by the control part by the energization pulse.

In this configuration, the information relating to the behavior of the drive voltage when the fuel injector is not driven can be stored, so an effect of an induced electromotive force by a behavior of the valve body of the fuel injector is reduced and hence information strongly affected by a degree of variation by an individual difference of the magnetic circuit can be held. Hence, when this information is used, a degree of variation in the behavior of the drive voltage, which is affected by the individual difference of the magnetic circuit of the fuel injector, can be detected with accuracy.

According to the present disclosure, it is possible to provide a fuel injection control device for an internal combustion engine that can detect a degree of variation in a behavior of a drive voltage, which is affected by an individual difference of a magnetic circuit of a fuel injector, with high accuracy.

BRIEF DESCRIPTION OF DRAWINGS

FIG. 13 is a time chart to illustrate an example of calculating a voltage inflection point time.

EMBODIMENTS FOR CARRYING OUT INVENTION

Hereinafter, embodiments of the present disclosure will be described with reference to the accompanying drawings. For the purpose of easily understanding the descriptions, the same constituent elements in the respective drawings will be denoted by the same reference signs as far as possible and their duplicate descriptions will be omitted.

An engine control system 10 to which an ECU (fuel injection control device) according to an embodiment of the present disclosure is applied will be described with reference to FIG. 1 to FIG. 4.

Figure 1:
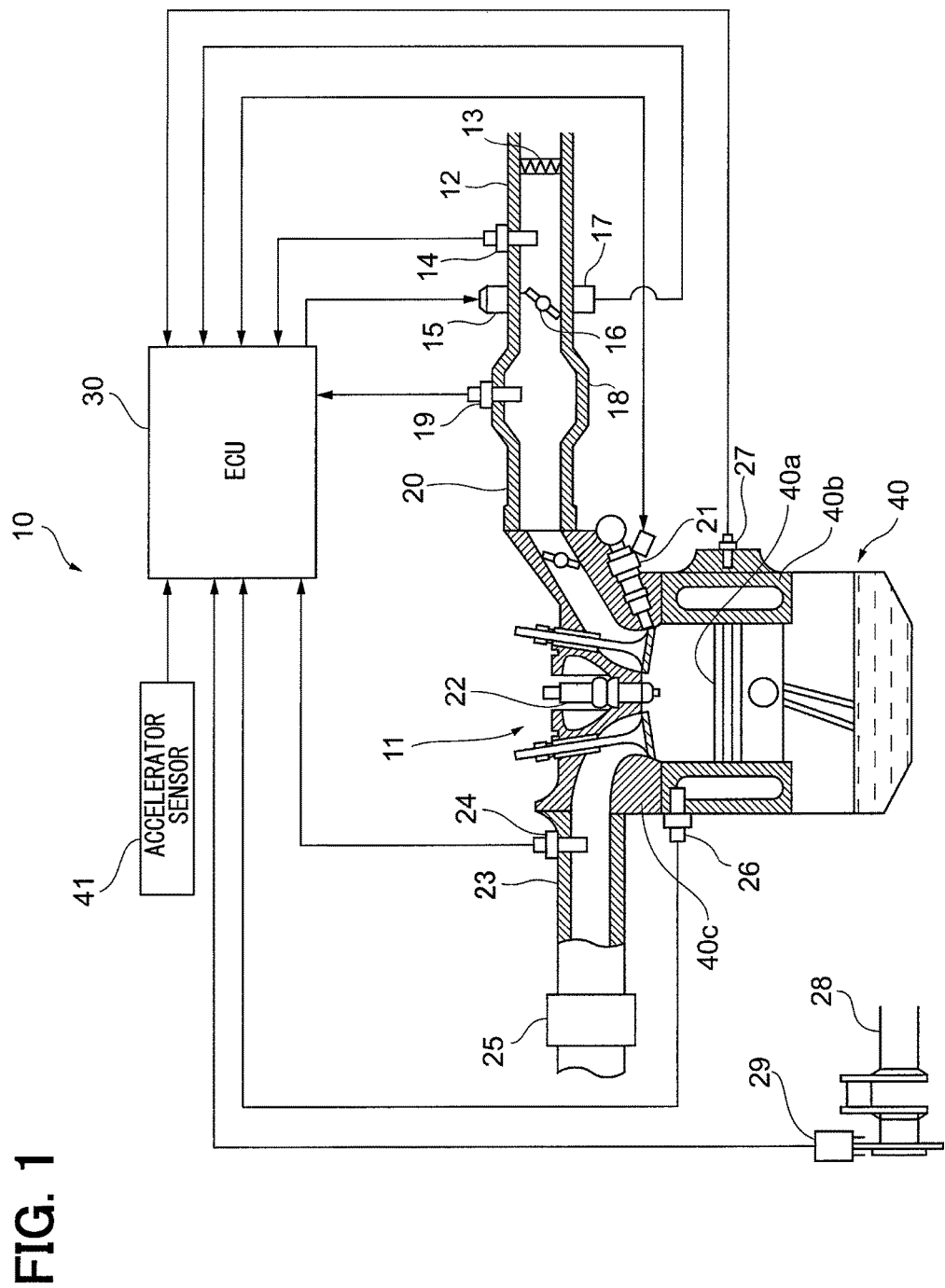
FIG. 1 is a figure to show a general configuration of an engine control system to which an ECU (fuel injection control device) according to one embodiment of the present disclosure is applied.

As shown in FIG. 1, the engine control system 10 includes a direct injection type engine 11 (hereinafter, simply denoted by "engine 11") that is an internal combustion engine of a direct injection type and an electronic control unit 30 (hereinafter, denoted by "ECU 30") and is configured in such a way that the ECU 30 controls a behavior of the engine 11. The engine 11 has a plurality of cylinders 40, for example, like an in-line four-cylinder engine that has four cylinders, but only a single cylinder 40 and pipes connected to the cylinder 40 will be shown in FIG. 1.

An air cleaner 13 is provided in the most upstream portion of an air intake pipe 12 of the engine 11, and an air flow meter 14 for detecting an intake air amount is provided on a downstream side of the air cleaner 13. A throttle valve 16 whose opening is controlled by a motor 15 and a throttle opening sensor 17 that detects an opening of the throttle valve 16 (throttle valve opening) are provided on a downstream side of the air flow meter 14.

Further, a surge tank 18 is provided on a downstream side of the throttle valve 16, and the surge tank 18 is provided with an air intake pipe pressure sensor 19 that detects an air intake pipe pressure. Still further, the surge tank 18 is provided with an air intake manifold 20 that introduces air into the respective cylinders 40 of the engine 11.

The cylinder 40 has a piston 40a and a cylinder 40b. Each of the cylinders 40 of the engine 11 is provided with a fuel injector 21 that directly injects fuel into each cylinder. Further, a cylinder head 40c above the cylinder 40b is provided with an ignition plug 22 for each cylinder 40 and an air-fuel mixture in the cylinder is ignited by a spark discharge of the ignition plug 22 of each cylinder 40.

Figure 2:
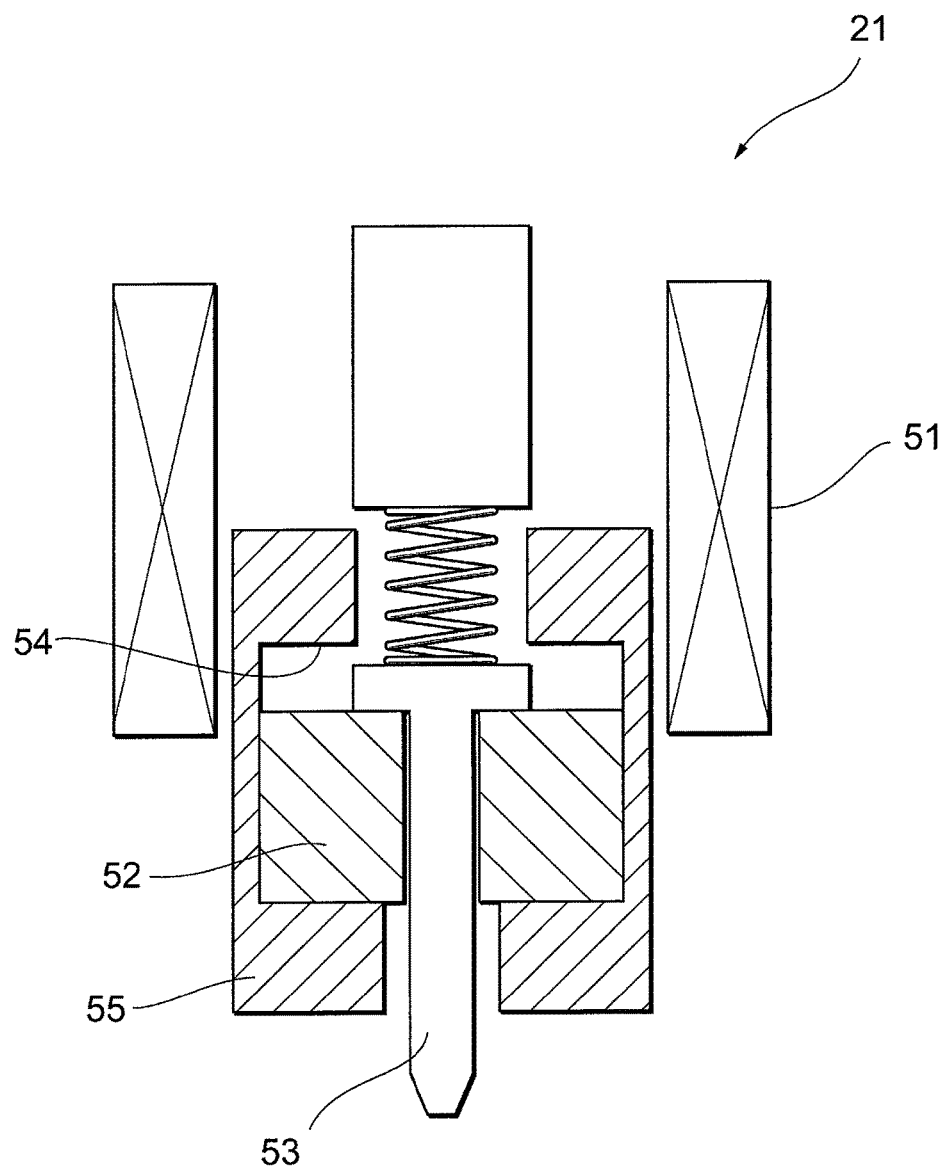
FIG. 2 is a schematic view to show a general configuration of a fuel injector of FIG. 1.

As shown in FIG. 2, the fuel injector 21 includes a drive coil 51, a plunger 52, a needle valve 53 (valve body), a stopper 54, and a fixed core 55. The fuel injector 21 is an injector of a well-known electromagnetic drive type (solenoid type). The fuel injector valve 21 is configured in the following manner: that is, when an electric current is passed through the drive coil 51 of a solenoid built in the fuel injector 21, the needle valve 53 is driven integrally with the plunger 52 (movable core) in a direction to open the fuel injector 21 by an electromagnetic force generated by the drive coil 51 to thereby bring about a valve opening state, whereby a fuel injection is performed. In the fuel injector 21, when the electric current passed through the drive coil 51 is stopped, the needle valve 53 is returned to a valve closing position to thereby bring about a valve closing state, whereby the fuel injection is stopped. Here, a fuel injection control by the fuel injector 21 will be described later in detail.

To the respective cylinders 40 of the engine 11 is connected an exhaust pipe 23. The exhaust pipe 23 is provided with an exhaust gas sensor (air-fuel ratio sensor, oxygen sensor, or the like) that senses an air-fuel ratio or a rich/lean state of an exhaust gas, and a catalyst 25 such as a three-way catalyst or the like that cleans the exhaust gas is provided on a downstream side of the exhaust gas sensor 24.

Further, a cylinder 40b of the engine 11 is provided with a cooling water temperature sensor 26 that senses a cooling water temperature and a knock senor 27 that senses a knocking. Although not shown in FIG. 1, a crank shaft 28 that transforms a reciprocating motion of the piston 40a to a circular motion is coupled to each piston 40a. A crank angle sensor 29 that outputs a pulse signal every time the crank shaft 28 is rotated by a specified crank angle is fixed on an outer circumferential side of the crank shaft 28, and a crank angle and an engine speed are sensed on the basis of an output signal of the crank angle sensor 29. The engine control system 10 is provided with an accelerator sensor 41 that senses an accelerator operation (a pressing amount of an accelerator pedal).

Output signals from these various kinds of sensors are inputted to the ECU 30. The ECU 30 mainly has a microcomputer and executes various kinds of engine control programs stored in a built-in ROM (storage medium), thereby controlling a fuel injection amount, an ignition timing, a throttle opening (intake air amount), and the like according to an engine operating state.

Figure 3:
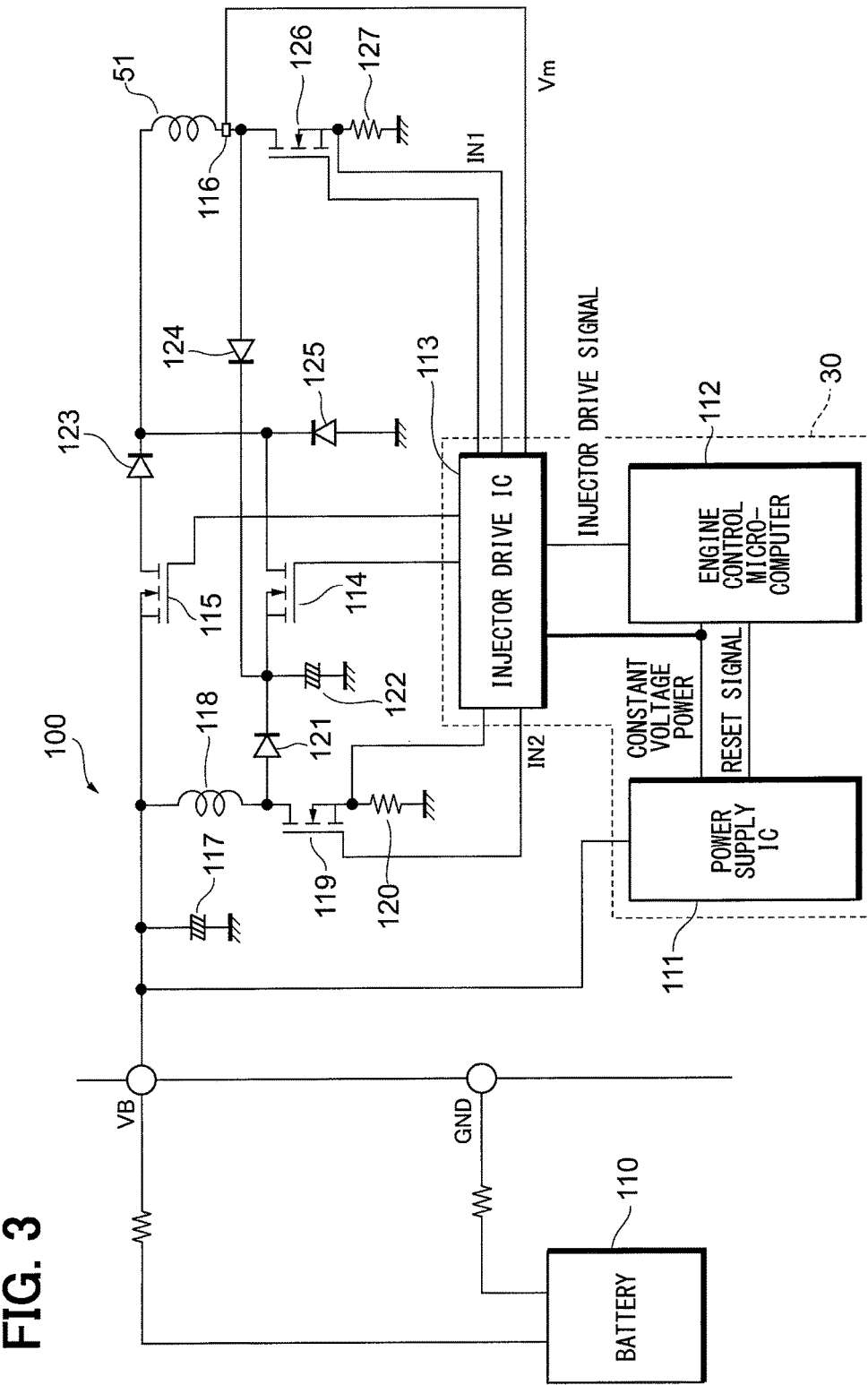
FIG. 3 is a diagram to show one example of a configuration of a drive circuit of a fuel injector.
Figure 4:
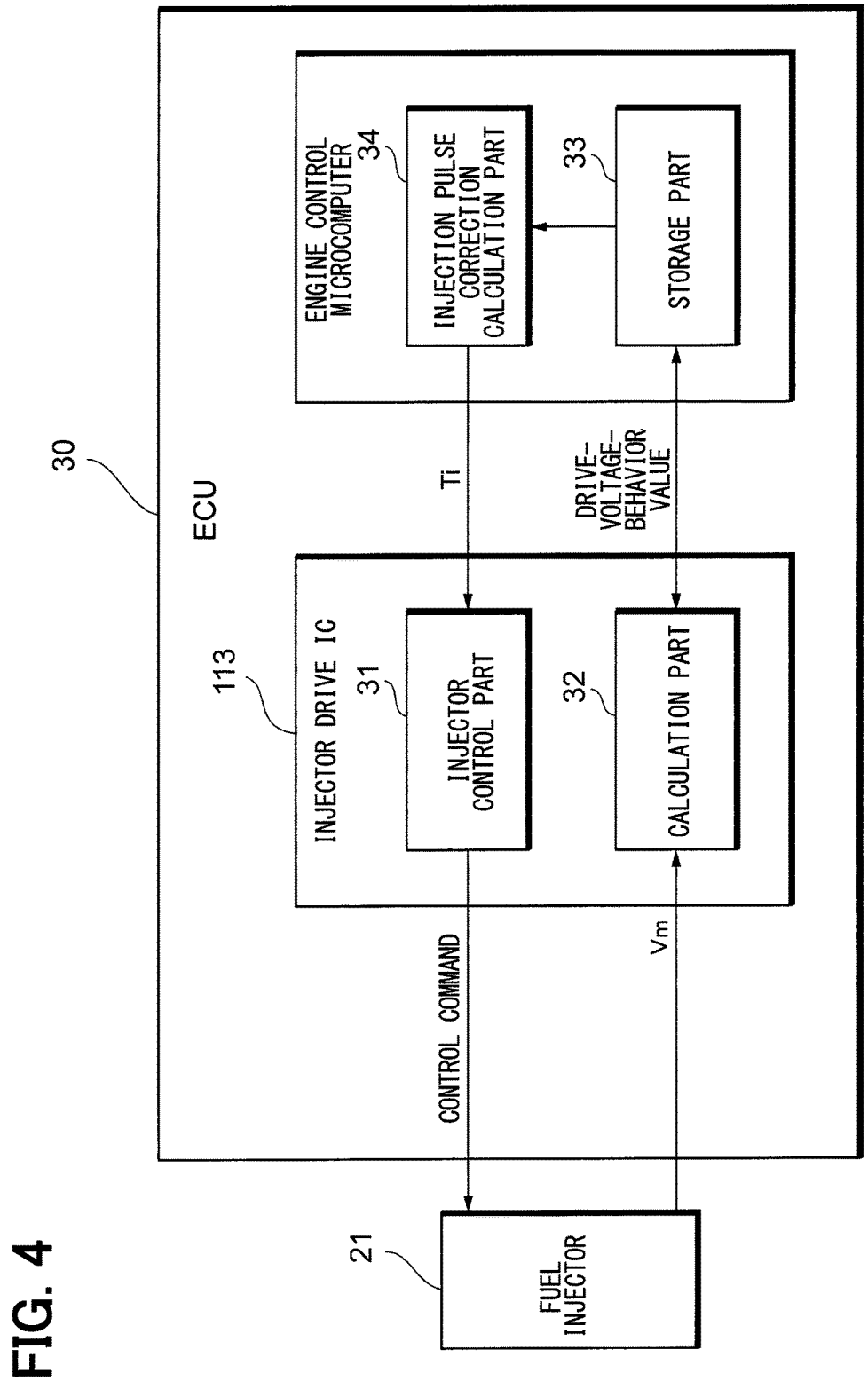
FIG. 4 is a function block diagram of the ECU of FIG. 1.

As shown in FIG. 3 and FIG. 4, the ECU 30 is provided with an engine control microcomputer 112 (microcomputer for controlling the engine 11), an injector drive IC 113 (IC for driving the fuel injector 21), and the like. The ECU 30, as shown in FIG. 4, calculates a required injection amount according to the engine operating state (for example, engine speed, engine load, or the like) and calculates a required injection pulse width Ti (injection time) according to the required injection amount. Then, the ECU 30 opens the fuel injector 21 by the required injection pulse width Ti corresponding to the required fuel injection amount by the injector drive IC 113, thereby injecting fuel of the required injection amount. Further, as shown in FIG. 3, the ECU 30 is provided with also a power supply IC 111 that supplies the engine control microcomputer 112 with a constant voltage power.

The energization of the drive coil 51 of the electromagnetic drive type (solenoid type) fuel injector 21, as shown in FIG. 3, is controlled by a drive circuit 100 including the ECU 30. Describing this in more detail, the drive circuit 100 controls an energization start timing and an energization time period (in other words, energization stop timing) to the drive coil 51, thereby controlling the fuel injection amount and a fuel injection timing to each cylinder 40b by the fuel injector 21.

As shown in FIG. 3, the drive circuit 100 of the fuel injector 21 is provided with a battery 110, the power supply IC 111, the engine control microcomputer 112, and the injector drive IC 113. The battery 110 is a battery power supply part that supplies an electric power for energizing the drive coil 51 and an electric power for driving the engine control microcomputer 112.

The power supply IC 111 is a constant voltage power supply part that supplies the engine control microcomputer 112 with the constant voltage power. When the power supply IC 111 cannot supply the engine control microcomputer 112 with the constant voltage power, the power supply IC 111 outputs a reset signal to reset the engine control microcomputer 112.

The engine control microcomputer 112 is a control part that outputs an injector drive signal to the injector drive IC 113. The engine control microcomputer 112 is configured in such a way to perform a reset operation when a reset signal is inputted from the power supply IC 111.

The injector drive IC 113 is a control part that performs an energization control to the drive coil 51 of the fuel injector 21 on the basis of the injector drive signal inputted from the engine control microcomputer 112. The injector drive IC 113 controls the energization of a discharge switch 114, a constant current switch 115, a charge switch 119, and a cylinder selection switch 126, each of which has a MOS transistor, thereby these switches 114, 115, 119, 126 are turned ON or OFF.

The cylinder selection witch 126 has one output terminal (drain) connected to other end of the drive coil 51 (on a downstream side in an energization path of the drive coil 51). A current detection resistance 127 is interposed between the other output terminal (source) of the cylinder selection switch 126 and a ground line. The current detection resistance 127 detects an electric current (drive current) passing through the drive coil 51 via the cylinder selection switch 126 and a voltage developed in the current detection resistance 127 is inputted to the injector drive IC 113 as a current detection signal IN1 to show a detection current.

The drive circuit 100 that the injector drive IC 113 controls is further provided with diodes 121, 123, 124, and 125, capacitors 117 and 122, an inductor 118, and a resistance 120. The charge switch 119, the inductor 118, the resistance 120, and the diode 121 form a voltage booster circuit that charges the capacitor 122 to a specified charge voltage.

The inductor 118 has its one end connected to a power supply which supplies a battery voltage VB and has its other end connected to one output terminal (drain) of the charge switch 119. The other output terminal (source) of the charge switch 119 is grounded via the resistance 120. A gate terminal of the charge switch 119 is connected to the injector drive IC 113, and the charge switch 119 is turned ON or OFF according to an output of the injector drive IC 113.

Further, one end (positive side terminal) of the capacitor 122 is connected to a connection point of the inductor 118 and the charge switch 119 via the diode 121 for preventing a backward flow. Then, the other end (negative side terminal) of the capacitor 122 is grounded.

In this voltage booster circuit, when the charge switch 119 is turned ON or OFF, a fly-back voltage (back electromotive voltage) that is higher than the battery voltage VB is generated at the connection point of the inductor 118 and the charge switch 119 and the capacitor 122 is charged through the diode 121 by the fly-back voltage. In this way, the capacitor 122 is charged to a voltage higher than the battery voltage VB. The capacitor 122 is controlled by the injector drive IC 113 in such a way that the charge voltage is brought to a specified charge voltage set in advance.

The discharge switch 114 supplies the drive coil 51 with a large electric current to open the fuel injector 21 from the capacitor 122. The discharge switch 114 is provided so as to discharge electric energy charged to the capacitor 122 to the drive coil 51. When the discharge switch 114 is turned ON, the positive side terminal (terminal on high voltage) of the capacitor 122 is electrically connected to one end side of the drive coil 51, whereby discharge from the capacitor 122 to the drive coil 51 is started. In addition to the voltage booster circuit described above, the discharge switch 114 and the capacitor 122 construct a peak current drive circuit.

The constant current switch 115 passes a given current (holding current), which holds a valve opening state after the fuel injector 21 is opened, to the drive coil 51. When the constant current switch 115 is turned ON in a state where the cylinder selection switch 126 is ON, an electric current is passed through the drive coil 51 via the diode 123 for preventing a backward flow from a power supply line. In this regard, the diode 125 is a feedback diode for a constant current control for the drive coil 51 and feeds back the electric current to the drive coil 51 when the constant current switch 115 is turned OFF from ON in a state where the cylinder selection switch 126 is ON. The constant current switch 115, the diode 123, and the diode 125 construct a constant current drive circuit.

The engine control microcomputer 112 performs various kinds of controls to operate the engine 11. One of the controls is to generate and output an injector drive signal. The engine control microcomputer 112 generates the injector drive signal for each cylinder 40 on the basis of the operating information of the engine 11 sensed by the various kinds of sensors described above, for example, the engine speed, an accelerator opening, an engine coolant temperature, and a fuel pressure in a common rail, and outputs the injector drive signal to the injector drive IC 113.

The injector drive IC 113 is configured in such a way as to detect a voltage of an electric power line from the power supply IC 111 of the constant voltage power supply part to the engine control microcomputer 112 as a determination voltage IN2. In a case where the determination voltage IN2 is lower than a threshold voltage which is higher than a reset voltage by a specified voltage, the injector drive IC 113 outputs a drive signal to turn OFF the constant current switch 115. Further, in a case where the current detection signal IN1 indicating an electric current passing through the drive coil 51 is lower than a threshold current and the determination voltage IN2 is lower than the threshold voltage after the injector drive IC 113 outputs the drive signal to turn OFF the constant current switch 115, the injector drive IC 113 keeps a state in which the constant current switch 115 is OFF.

In the present embodiment, the injector drive IC 113 is configured in such a way as to detect a voltage value (minus terminal voltage Vm) at a minus terminal 116 of the drive coil 51 of the fuel injector 21. The minus terminal 116 of the drive coil 51, as shown in FIG. 3, is arranged closer to a drive coil 51 side (on the downstream side in the energization path of the drive coil 51) than a connection point of one output terminal (drain) of the cylinder selection switch 126 and the diode 124 in the drive circuit 100.

Figure 5:
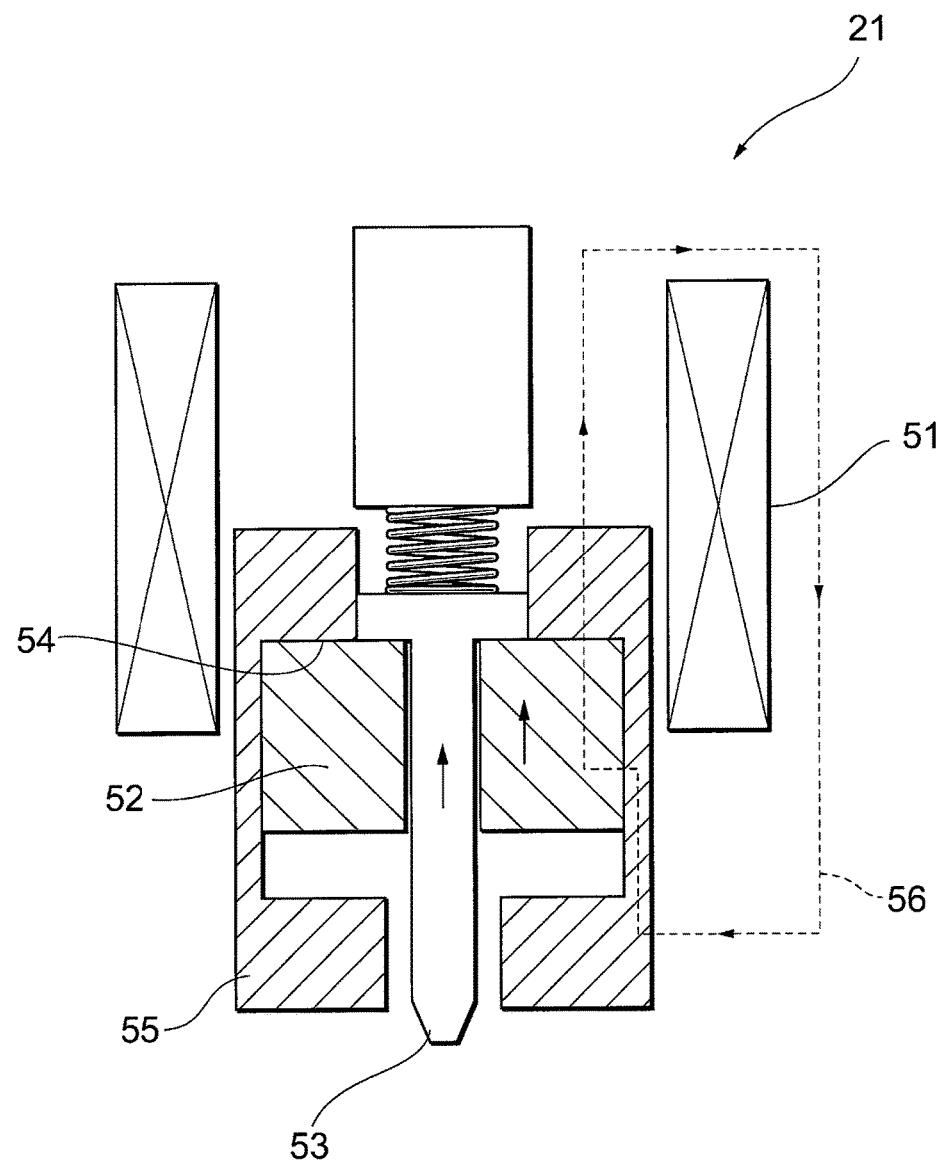
FIG. 5 is a schematic view to show a valve opening state at the time of a full lift injection of a fuel injector.
Figure 6:
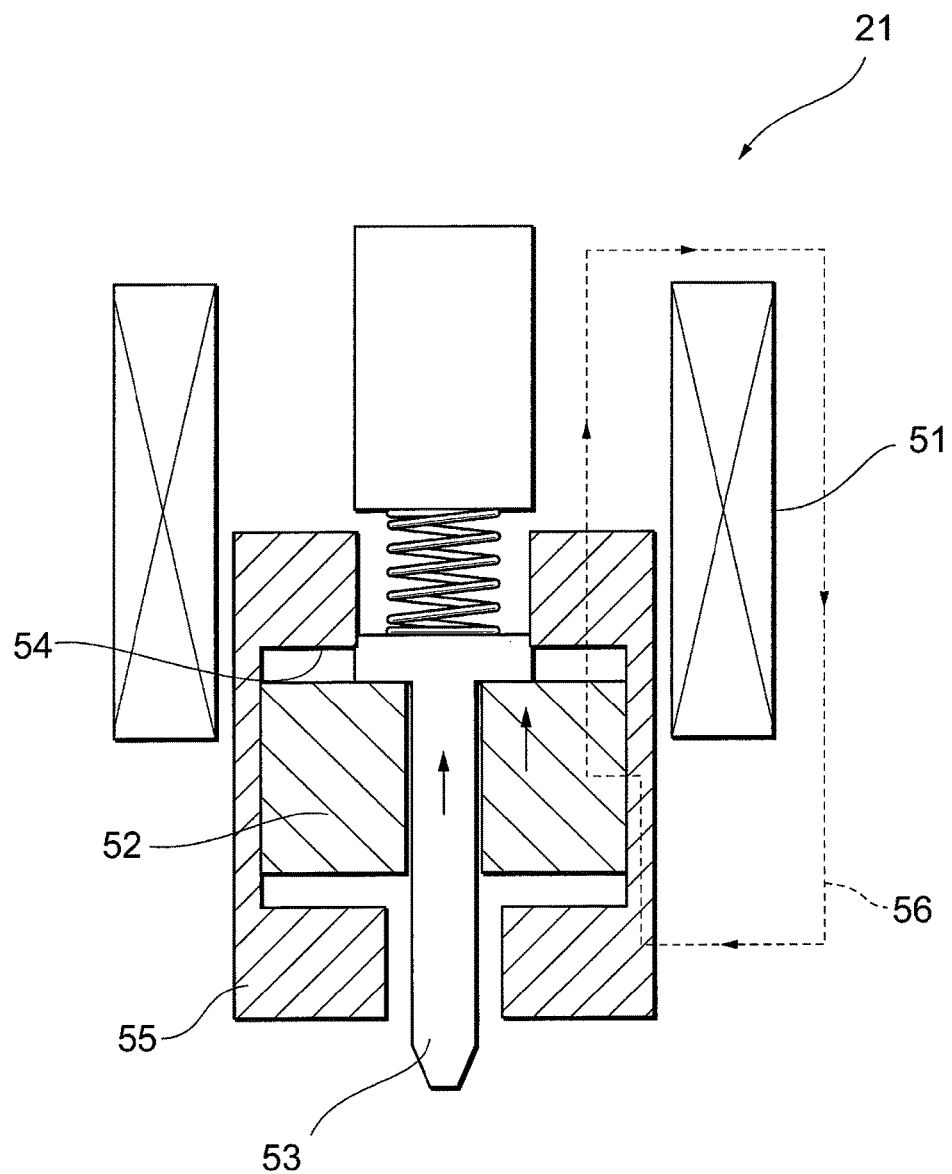
FIG. 6 is a schematic view to show a valve opening state at the time of a partial lift injection of a fuel injector.

A valve opening operation of the fuel injector 21 of the electromagnetic drive type will be described with reference to FIG. 2 and FIG. 5 to FIG. 7. In the fuel injector 21, when an injection pulse is turned ON to thereby energize the drive coil 51, as shown in FIG. 5 and FIG. 6, a magnetic circuit 56 which passes through the fixed core 55 and the plunger 52 (movable core) is formed by the energization of the drive coil 51. An electromagnetic attraction force is applied in an axial direction between the fixed core 55 and the plunger 52 by the magnetic circuit 56, whereby the needle valve 53 (valve body) is driven with the plunger 52 in a valve opening direction (in an upward direction in FIG. 5 and FIG. 6) by the electromagnetic attraction force and then the fuel injector 21 is brought into a valve opening state.

Figure 7:
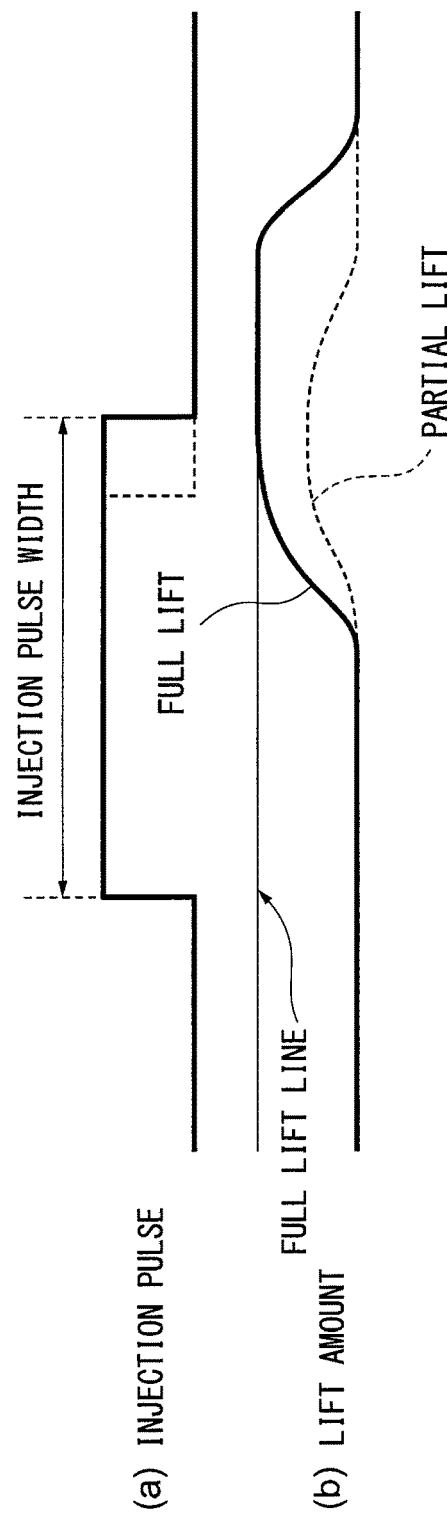
FIG. 7 is a time chart to show an injection pulse and a lift amount at the time of a full lift injection and at the time of a partial lift injection of a fuel injector.

The valve opening state of the fuel injector 21 is divided into a full lift range shown in FIG. 5 and a partial lift range shown in FIG. 6 according to an injection pulse width of the injection pulse. FIG. 7(a) shows an injection pulse and FIG. 7(b) shows a lift amount as characteristics when the fuel injector 21 is opened. As shown in FIG. 7, when the fuel injector 21 is energized by an injection pulse having a specified current value and a specified injection pulse width, the needle valve 53 is opened by a lift amount corresponding to the injection pulse width.

In the full lift range in which the injection pulse width is comparatively long as shown by a solid line in FIG. 7, the lift amount of the needle valve 53 reaches a full lift position (position in which the plunger 52 abuts on a stopper 54), as shown in FIG. 5. On the other hand, in the partial lift range in which the injection pulse width is comparatively short as shown by a dotted line in FIG. 7, a partial lift state is brought about in which the lift amount of the needle valve 53 does not reach the full lift position (state in which the plunger 52 does not yet abut on the stopper 54), as shown in FIG. 6.

In the full lift range, the ECU 30 performs a full lift injection to open the fuel injector 21 by an injection pulse in which the lift amount of the needle valve 53 reaches the full lift position, whereas in the partial lift range, the ECU 30 performs a partial lift injection to open the fuel injector 21 by an injection pulse which brings about a partial lift state in which the lift amount of the needle valve 53 does not reach the full lift position.

Figure 8:
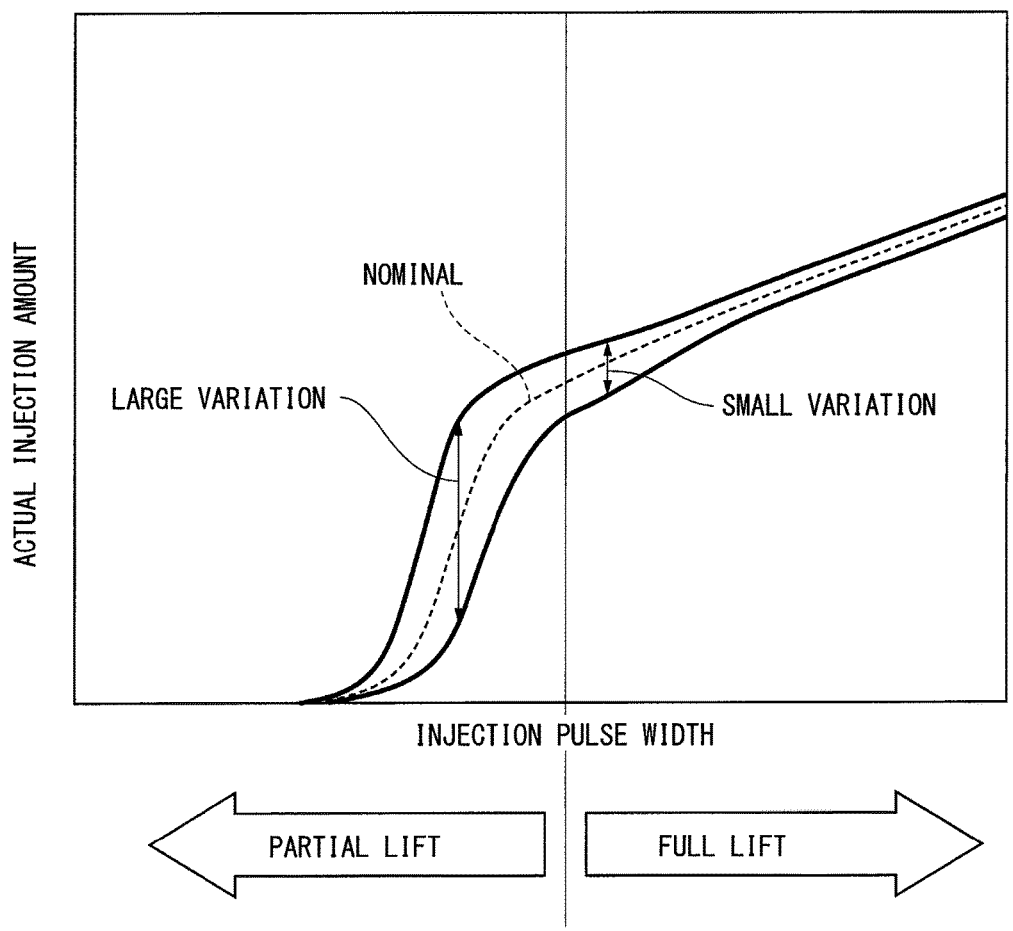
FIG. 8 is a graph to show a relationship between an injection pulse width and an actual injection amount of a fuel injector.

In the fuel injector 21 of the direct injection type engine 11 that injects fuel of high pressure into the cylinder, as shown in FIG. 8, linearity of a change characteristic of an actual injection amount with respect to an injection pulse width tends to be worse in the partial lift range (range to bring about the partial lift state in which the injection pulse width is short and in which the lift amount of the needle valve 53 does not reach the full lift position). In this partial lift range, variations in the lift amount of the needle valve 53 tend to become large between the individual fuel injectors 21 and hence variations in the injection amount tend to become large. Then, when the variations in the injection amount become large, an exhaust emission and drivability are likely to become worse.

In the fuel injector 21, after the injection pulse is turned OFF, the minus terminal voltage Vm is changed by an induced electromotive force (see FIG. 13). At that time, when the fuel injector 21 is closed, a change speed of the needle valve 53 (change speed of the plunger 52) is changed comparatively greatly and hence a change characteristic of the minus terminal voltage Vm is changed, so that a voltage inflection point in which the change characteristic of the minus terminal voltage Vm is changed is developed near a valve closing timing. In other words, it is thought that the change characteristic of the minus terminal voltage Vm near the valve closing timing of the fuel injector 21 correlates with the valve closing timing of the fuel injector 21. Further, the valve closing timing of the fuel injector 21 also correlates with the actual fuel injection amount of the fuel injector 21. Hence, it is thought that, by observing a behavior of the minus terminal voltage Vm (drive voltage), a behavior of an armature of the fuel injector 21 (that is, a behavior of the lift amount of the needle valve 53), the valve closing timing, and the fuel injection amount can be estimated with high accuracy.

It is general that a behavior of the drive voltage of the fuel injector 21 is affected by variations in the magnetic circuit 56 of the fuel injector 21 and that variations are hence caused in the individual fuel injectors 21. Here, "the variations in the magnetic circuit 56" mean individual difference of the magnetic circuit 56 formed in the individual fuel injector 21 and, for example, are caused by a variance in a state in which the fixed core 55 and the plunger 52 (movable core), which have the magnetic circuit 56 formed therein, are combined with each other. For this reason, in order to improve detection accuracy of the behavior of the fuel injector 21 using the minus terminal voltage Vm (drive voltage), it is desired to detect variations in the magnetic circuit 56 among the individual fuel injectors 21 with high accuracy.

However, the induced electromotive force generated by the behavior of the armature (behavior of the needle valve 53) of the fuel injector 21 is superimposed on the behavior of the drive voltage in a period during which the fuel injector 21 is being opened. For this reason, in a state where the fuel injector 21 is driven, there is a case where the variations in the magnetic circuit 56 and an induced electromotive force amount generated by the behavior of the armature of the solenoid cannot be separated from each other, which hence makes it difficult to detect the variations in the magnetic circuit 56 from the behavior of the drive voltage with high accuracy.

Hence, in the present embodiment, the magnetic circuit 56 is energized by a specified energization pulse within a range in which the needle valve 53 of the fuel injector 21 is not driven in place of the injection pulse used at the time of usually opening the fuel injector 21, and the variations in the magnetic circuit 56 are detected by the use of the behavior of the minus terminal voltage Vm (drive voltage) at this time.

Figure 9:
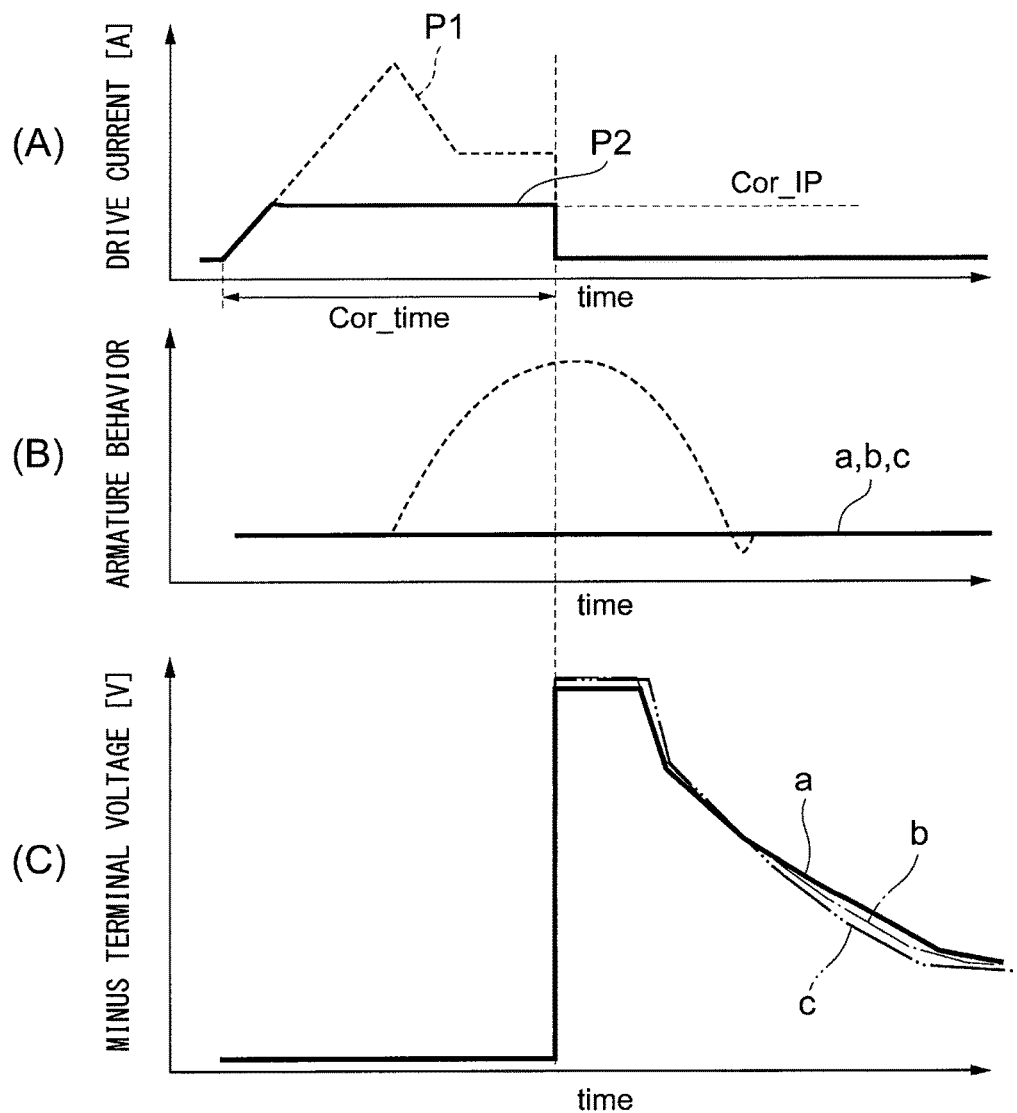
FIG. 9 is time charts to illustrate variations in a behavior of a drive voltage affected by a magnetic circuit of a fuel injector.
Figure 10:
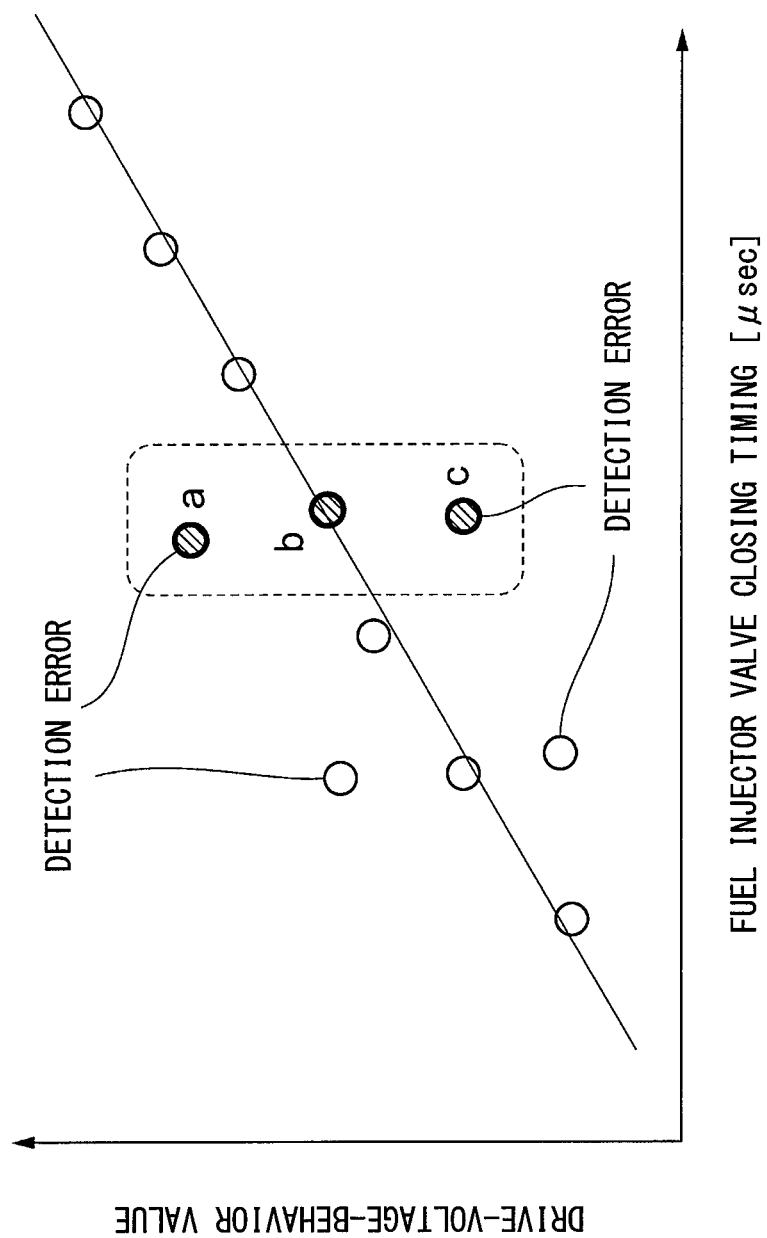
FIG. 10 is a graph to show an example of variations in a drive-voltage-behavior value calculated from a behavior of a minus terminal voltage shown in FIG. 9.

Here, a technique for detecting the variations in the magnetic circuit 56 in the present embodiment will be further described with reference to FIG. 9 and FIG. 10. FIG. 9(A) shows a drive current, FIG. 9(B) shows a behavior of an armature (needle valve 53), and FIG. 9(C) shows a temporal change of a minus terminal voltage when an energization pulse is applied to a fuel injector. In FIG. 9 and FIG. 10, behaviors of three fuel injectors are shown as examples and the behaviors corresponding to the respective fuel injectors are denoted by signs "a", "b", and "c". A horizontal axis of FIG. 10 is a valve closing timing and a vertical axis is a drive-voltage-behavior value, and FIG. 10 shows a characteristic between the valve closing timing and the drive-voltage-behavior value. As shown by a graph of a straight line in FIG. 10, a standard relationship between the valve closing timing and the drive-voltage-behavior value is a proportional relationship. Here, "the drive-voltage-behavior value" is a value derived from the behavior (for example, time transition) of the drive voltage such as the minus terminal voltage Vm.

As "the drive-voltage-behavior value", an arbitrary index such as an index that uses time as a unit (for example, a differential value of the minus terminal voltage) and an index that uses voltage as a unit (for example, a voltage difference from a reference voltage at the present time) can be selected. As an example of the drive-voltage-behavior value, a time (voltage inflection point time Tdiff) can be given which passes from a specified reference timing until a timing when the voltage inflection point is generated in connection with the voltage inflection point in which the change characteristic of the minus terminal voltage Vm is changed near the valve closing timing. Here, firstly, the behavior of the drive voltage of the fuel injector 21 will be described as a general idea by the use of a technical word of "the drive-voltage-behavior value" and the voltage inflection point time Tdiff will be described later in detail with reference to FIG. 12 and FIG. 13.

When the fuel injector 21 is energized by a specified injection pulse as shown by a dotted line in FIG. 9(A), the armature (needle valve 53) is driven in a valve opening direction as shown by a dotted line in FIG. 9(B). The behavior of the minus terminal voltage Vm at this time includes variations in the magnetic circuit 56 and has the induced electromotive force by the behavior of the armature superimposed thereon. For this reason, in a state where the fuel injector 21 is driven, the variations in the magnetic circuit 56 and the induced electromotive force mount cannot be separated from each other and hence detection accuracy of the variations in the magnetic circuit 56 is likely to be reduced.

In contrast to this, in the present embodiment, the magnetic circuit 56 is energized by "a specified energization pulse" within a range in which the needle valve 53 (valve body) of the fuel injector 21 is not driven. In an energization pulse P2, as shown by a solid line in FIG. 9(A), a pulse width is the same as an injection pulse P1 but a target current value is set smaller than the injection pulse P1. This energization pulse P2 inputs drive energy (electric current) of an extent in which the valve body of the fuel injector 21 is not driven. In this way, as shown by a solid line in FIG. 9(B), the armature (needle valve 53) is not driven also while energizing the magnetic circuit 56 and hence a variance among the behaviors "a", "b", "c" of the minus terminal voltage Vm in three fuel injectors 21, which are shown in FIG. 9(C), can be detected in a state where an effect of the behavior of the armature is not caused. For this reason, it is possible to detect the behavior of the minus terminal voltage Vm which is strongly affected by the variations in the magnetic circuit 56 in each injection valve 21. The drive-voltage-behavior value derived by the use of the behaviors "a", "b", "c" of the minus terminal voltage Vm detected in this manner also becomes a value which strongly reflects the variations in the individual magnetic circuits 56, and as shown in FIG. 10, differences among the drive-voltage-behavior values "a", "b", "c" which are derived from the drive voltages of three fuel injectors 21 correspond to a magnetic circuit variation value which shows a degree of variation in the magnetic circuit 56 of each of the fuel injectors 21 (which will be described later in detail).

In view of this characteristics, in the present embodiment, the ECU 30 measures the minus terminal voltage Vm (drive voltage) when the magnetic circuit 56 is energized by the specified energization pulse of the range in which the needle valve 53 (valve body) of the fuel injector 21 is not driven and calculates the magnetic circuit variation value as information relating to the minus terminal voltage Vm (drive voltage) by the use of the behavior of the measured minus terminal voltage and stores the magnetic circuit variation value as the information relating to the valve closing timing. Then, the ECU 30 is configured in such a way as to correct the injection pulse of the partial lift injection on the basis of the magnetic circuit variation value to thereby inhibit variations in the injection amount among the individual fuel injectors 21.

As shown in FIG. 4, the ECU 30 includes an injector control part 31, a calculation part 32, a storage part 33, and an injection pulse correction calculation part 34 which relate to the respective functions described above. The injector control part 31 and the calculation part 32 are included in the injector drive IC 113, whereas the storage part 33 and the injection pulse correction calculation part 34 are included in the engine control microcomputer 112.

The injector control part 31 energizes the magnetic circuit 56 of the fuel injector 21 by a specified injection pulse to thereby open the fuel injector 21. Further, the injector control part 31 energizes the magnetic circuit 56 by a specified energization pulse at the time of acquiring time series data of the minus terminal voltage Vm which are used for calculating the drive-voltage-behavior value by the calculation part 32.

The calculation part 32 calculates the drive-voltage-behavior value on the basis of the minus terminal voltage Vm which is detected from the fuel injector 21 energized by the energization pulse by the injector control part 31 and calculates the magnetic circuit variation value by the use of the drive-voltage-behavior value calculated by the injector control part 31.

The storage part 33 stores the magnetic circuit variation value calculated by the calculation part 32.

The injection pulse correction calculation part 34 performs a correction calculation of the injection pulse applied to the fuel injector 21 by the use of the magnetic circuit variation value stored in the storage part 33. Specifically, the injection pulse correction calculation part 34 corrects a target pulse width Ti of the injection pulse (that is, an energization time of the fuel injector 21) according to the magnetic circuit variation value calculated for each of the fuel injectors 21. The injector control part 31 energizes each of the fuel injectors 21 according to these corrected target pulse widths.

Figure 11:
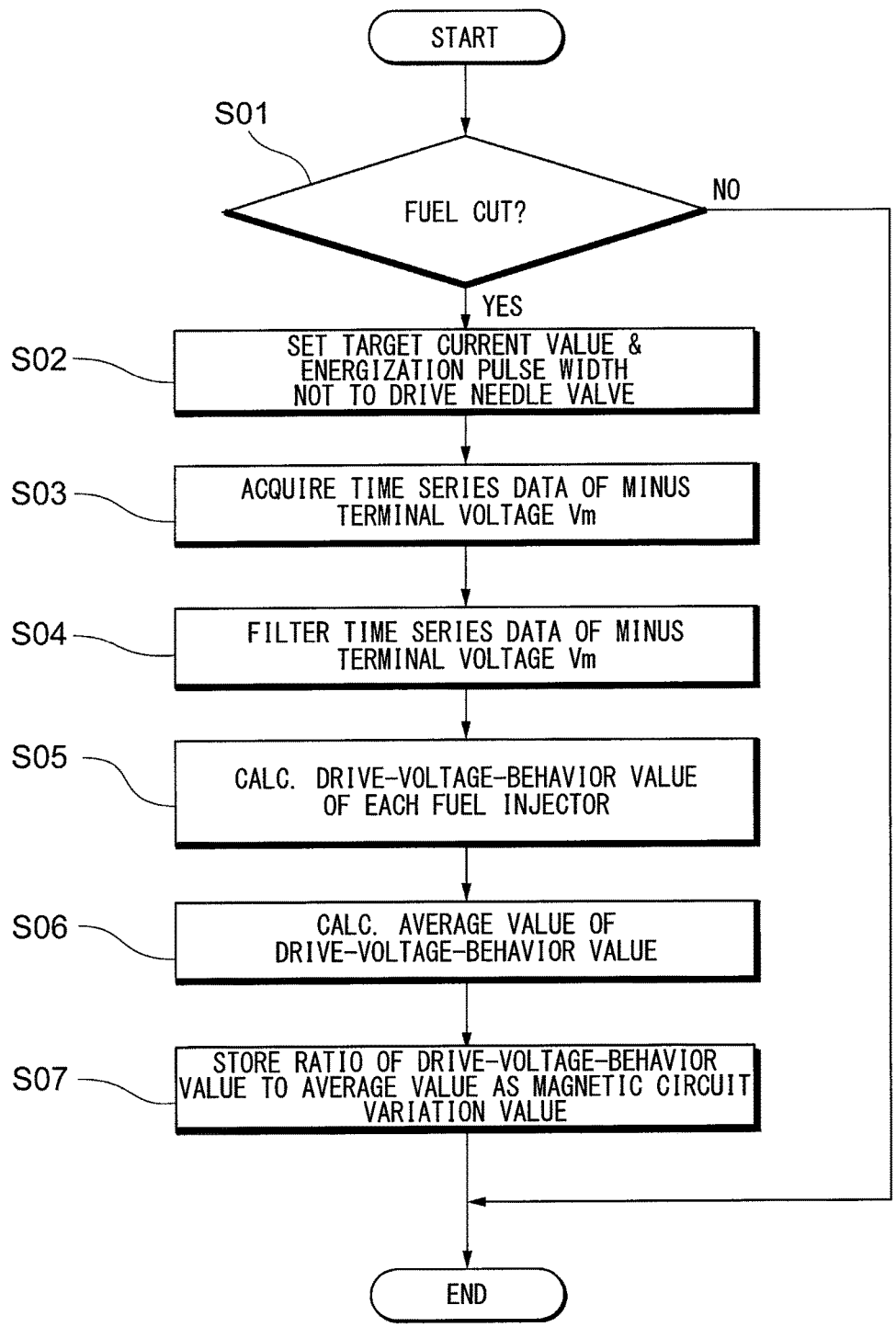
FIG. 11 is a flow chart to show calculation processing of a magnetic circuit variation value performed by an ECU according to the present embodiment.

Calculation processing of the magnetic circuit variation value will be described in detail with reference to a flow chart shown in FIG. 11. A control flow shown in FIG. 11 is performed, for example, at a specified period by the ECU 30.

In step S01, the injector control part 31 checks whether or not a present operating state of the engine 11 is a state in which fuel is being cut. The injector control part 31 acquires information of the operating state of the engine 11, for example, from the engine control microcomputer 112 and uses the information for the determination of whether or not the present operating state of the engine 11 is the state in which fuel is being cut. As a result of the determination of step S01, in a case where the present operating state of the engine 11 is the state in which fuel is being cut (step S01: YES), the present operating state of a vehicle is an operating state in which the fuel injector 21 is not driven, so the control flow proceeds to step S02 to start the calculation processing of the magnetic circuit variation value. On the other hand, in a case where the present operating state of the engine 11 is not the state in which fuel is being cut (step S02: NO), the present control flow is finished.

In step S02, the injector control part 31 sets the target current value (for example, Cor_IP shown in FIG. 9(A)) and the energization pulse width (for example, Cor_time shown in FIG. 9(A)), by which the needle valve 53 of the fuel injector 21 is not driven, on the basis of the present operating state of the engine 11. In this regard, only one of the target current value Cor_IP and the energization pulse width Cor_time may be set according to the operating state. The target current value Cor_IP, for example, is set higher as a control fuel pressure of the engine 11 is higher and is set lower as the control fuel pressure is lower. When the processing of step S02 is finished, the control flow proceeds to step S03.

In step S03, the injector control part 31 performs an energization control to energize the magnetic circuit 56 by the energization pulse P2 made of the target current value Cor_IP and the energization pulse width Cor_time which are set in step S02, and the calculation part 32 acquires the time series data of the minus terminal voltage Vm of each of the fuel injectors 21 during the energization control. The calculation part 32 acquires, for example, the behavior of the minus terminal voltage Vm after the energization pulse P2 is cut (when the energization pulse is switched to an off state). When the processing of step S03 is finished, the control flow proceeds to step S04.

In step S04, the calculation part 32 performs filtering processing of the time series data of the minus terminal voltage Vm acquired in step S03. When the filtering processing of step S04 is finished, the control flow proceeds to step S05.

In step S05, the calculation part 32 calculates the drive-voltage-behavior value V_fb of each of the fuel injectors 21 by the use of the time series data of the minus terminal voltage Vm subjected to the filtering processing in step S04. When the processing of step S05 is finished, the control flow proceeds to step S06.

In step S06, the calculation part 32 calculates an average value V_fb_Ave of the drive-voltage-behavior value Fob of each of the fuel injectors 21 which is calculated in step S05. When the processing of step S06 is finished, the control flow proceeds to step S07.

In step S07, the calculation part 32 calculates a ratio of the drive-voltage-behavior value V_fb of each of the fuel injectors 21 which is calculated in step SO5 to the average value V_fb_Ave of these drive-voltage-behavior values V_fb calculated in step S06 and the calculated value is stored in the storage part 33 as the magnetic circuit variation value. When the processing of step S07 is finished, the present control flow is finished.

The voltage inflection point time Tdiff, which is an example of the drive-voltage-behavior value described above, will be described with reference to FIG. 12 and FIG. 13.

After the energization pulse is turned OFF, the calculation part 32 of the injector drive IC 113 in the ECU 30 calculates a first filter voltage Vsm1 for each cylinder of the engine 11, which is obtained by subjecting the minus terminal voltage Vm of the fuel injector 21 to filtering processing (smoothing processing) by a first low-pass filter whose cut-off frequency is a first frequency f1 lower than a frequency of a noise component. Further, the calculation part 32 of the injector drive IC 113 calculates a second filter voltage Vsm2 for each cylinder of the engine 11, which is obtained by subjecting the minus terminal voltage Vm of the fuel injector 21 to filtering processing (smoothing processing) by a second low-pass filter whose cut-off frequency is a second frequency f2 lower than the first frequency f1. In this way, the first filter voltage Vsm1 in which the noise component is removed from the minus terminal voltage Vm and the second filter voltage Vsm2 for detecting the voltage inflection point can be calculated.

Further, the calculation part 32 of the injector drive IC 113 in the ECU 30 calculates the difference Vdiff (=Vsm1−Vsm2) between the first filter voltage Vsm1 and the second filter voltage Vsm2 for each cylinder of the engine 11, and calculates a time which passes from a specified reference timing until the difference Vdiff becomes an inflection point, as a voltage inflection point time Tdiff for each cylinder of the engine 11. At this time, in the present embodiment, the calculation part 32 of the injector drive IC 113 calculates the voltage inflection point time Tdiff by using a timing when the difference Differ becomes larger than a specified threshold value Vt as a timing when the difference Vdiff becomes an inflection point. In other words, the calculation part 32 of the injector drive IC 113 calculates a time which passes from the specified reference timing until the difference Vdiff becomes more than the specified threshold value Vt as the voltage inflection point time Tdiff. In this way, the voltage inflection point time Tdiff which changes according to the valve closing timing of the fuel injector 21 can be calculated with high accuracy. In the present embodiment, the voltage inflection point time Tdiff is calculated by using a timing when the energization pulse is turned ON from OFF as the reference timing.

Figure 12:
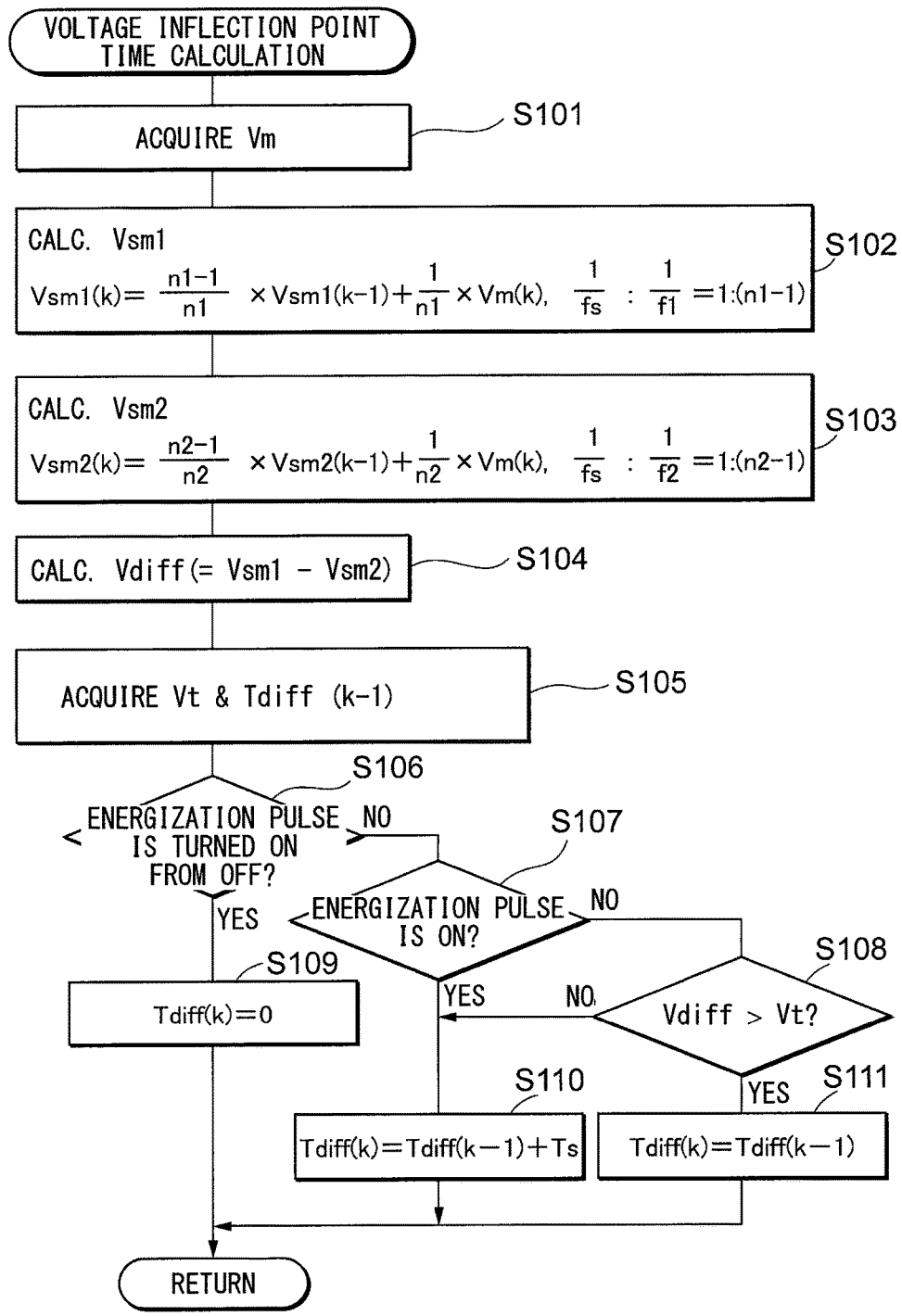
FIG. 12 is a flow chart to show a flow of calculation processing of a voltage inflection point time that is an example of a drive-voltage-behavior value.

The voltage inflection point time Tdiff can be calculated by a voltage inflection point time calculation routine, for example, shown by a flow chart of FIG. 12. This routine can be performed in step S05 of the flow chart shown in FIG. 11 in a case where the voltage inflection point time Tdiff is used as the drive-voltage-behavior value. In other words, the voltage inflection point time calculation routine shown in FIG. 12 is performed by the calculation part 32 of the ECU 30.

First, in step S101, the minus terminal voltage Vm of the fuel injector 21 is acquired. In this case, a calculation period Ts of the present routine becomes a sampling period Ts of the minus terminal voltage Vm.

Then, the routine proceeds to step S102 where the first filter voltage Vsm1, which is obtained by subjecting the minus terminal voltage Vm of the fuel injector 21 to the filtering processing by the first low-pass filter whose cut-off frequency is the first frequency f1 lower than the frequency of the noise component (in other words, a low-pass filter whose passband is a frequency band lower than the cut-off frequency f1), is calculated.

The first low-pass filter is a digital filter implemented by the following formula (1) which finds a current value Vsm1 (k) of the first filter voltage Vsm1 by the use of the previous value Vsm1 (k−1) of the first filter voltage Vsm1 and a current value Vm (k) of the minus terminal voltage Vm.

$$Vsm1\ (k)=\{(n1-1)/n1\}\times Vsm1\ (k-1)+(1/n1)\times Vm\ (k) \tag{1}$$

A time constant "n1" of the first low-pass filter is set in such a way as to satisfy the following formula (2) which uses a sampling frequency fs (=1/Ts) of the minus terminal voltage Vm and the cut-off frequency f1 of the first low-pass filter.

$$1/fs:1/f1=1:(n1-1) \tag{2}$$

In this way, the first filter voltage Vsm1 can be easily calculated by subjecting the minus terminal voltage Vm of the fuel injector 21 to the filtering processing by the first low-pass filter whose cut-off frequency is the first frequency f1 lower than the frequency of the noise component.

Then, the routine proceeds to step S103, where the second filter voltage Vsm2 is obtained by subjecting the minus terminal voltage Vm of the fuel injector 21 to the filtering processing by the second low-pass filter whose cut-off frequency is the second frequency f2 lower than the first frequency f1 (in other words, a low-pass filter whose passband is the frequency band lower than the cut-off frequency f2), is calculated.

The second low-pass filter is a digital filter implemented by the following formula (3) which finds a current value Vsm2 (k) of the second filter voltage Vsm2 by the use of the previous value Vsm2 (k−1) of the second filter voltage Vsm2 and a current value Vm (k) of the minus terminal voltage Vm.

$$Vsm2\ (k)=\{(n2-1)/n2\}\times Vsm2\ (k-1)+(1/n2)\times Vm\ (k) \quad (3)$$

A time constant "n2" of the second low-pass filter is set in such a way as to satisfy the following formula (4) which uses the sampling frequency fs (=1/Ts) of the minus terminal voltage Vm and the cut-off frequency f2 of the second low-pass filter.

$$1/fs:1/f2=1:(n2-1) \quad (4)$$

In this way, the second filter voltage Vsm2 is obtained by subjecting the minus terminal voltage Vm of the fuel injector 21 to the filtering processing by the second low-pass filter whose cut-off frequency is the second frequency f2 lower than the first frequency f1, can be easily calculated.

Then, the routine proceeds to step S104 where the difference Vdiff (=Vsm1−Vsm2) between the first filter voltage Vsm1 and the second filter voltage Vsm2 is calculated. In this regard, it is also recommended to perform guard processing for inhibiting the difference Vdiff from being "0" or more to thereby to extract only a minus component.

Then, the routine proceeds to step S105 where the threshold value Vt is acquired and the previous value Tdiff (k−1) of the voltage inflection point time Tdiff is also acquired. The threshold value Vt is calculated by the engine control microcomputer 112 according to a fuel pressure and a fuel temperature, for example. Alternatively, the threshold value Vt may be a fixed value which is set in advance.

Then, the routine proceeds to step S106 where it is determined whether or not this is a timing when the energization pulse is turned ON from OFF. In a case where it is determined in this step S106 that this is the timing when the energization pulse is turned ON from OFF, the routine proceeds to step S109 where a current value Tdiff (k) of the voltage inflection point time Tdiff is reset to "0".

$$Tdiff\ (k)=0$$

On the other hand, in a case where it is determined in this step S106 that this is not the timing when the energization pulse is turned ON from OFF, the routine proceeds to step S107 where it is determined whether or not the energization pulse is ON. In a case where it is determined in this step S107 that the energization pulse is ON, the routine proceeds to step S110 where a specified value Ts (the calculation period of the present routine) is added to the previous value Tdiff (k−1) of the voltage inflection point time Tdiff to thereby find the current value Tdiff (k) of the voltage inflection point time Tdiff, whereby the voltage inflection point time Tdiff is counted up.

$$Tdiff\ (k)=Tdiff\ (k-1)+Ts$$

Then, in a case where it is determined in step S107 that the energization pulse is not ON (in other words, the energization pulse is OFF), the routine proceeds to step S108 where it is determined whether or not the difference Vdiff between the first filter voltage Vsm1 and the second filter voltage Vsm2 is more than the threshold value Vt (the difference Vdiff is changed from smaller to larger than the threshold value Vt).

In a case where it is determined in step S108 that the difference Vdiff between the first filter voltage Vsm1 and the second filter voltage Vsm2 is not yet more than the threshold value Vt, the routine proceeds to step S110 where the processing of counting up the voltage inflection point time Tdiff is continued.

Then, in a case where it is determined in step S108 that the difference Vdiff between the first filter voltage Vsm1 and the second filter voltage Vsm2 is more than the threshold value Vt, it is determined that the calculation of the voltage inflection point time Tdiff is completed and then the routine proceeds to step S111 where the current value Tdiff (k) of the voltage inflection point time Tdiff is held at the previous value Tdiff (k−1).

$$Tdiff\ (k)=Tdiff\ (k-1)$$

In this way, a time which passes from a timing (reference timing) when the energization pulse is turned ON from OFF until the difference Vdiff is more than the threshold value Vt is calculated as the voltage inflection point time Tdiff and the calculated value of the voltage inflection point time Tdiff is held until a next reference timing. In this way, the processing of calculating the voltage inflection point time Tdiff is performed for each of the cylinders of the engine 11.

An example of calculating the voltage inflection point time Tdiff of the present embodiment will be described by the use of a time chart shown in FIG. 13.

After the energization pulse is turned OFF, the first filter voltage Vsm1 is calculated by filtering the minus terminal voltage Vm of the fuel injector 21 by the first low-pass filter, and the second filter voltage Vsm2 is calculated by filtering the minus terminal voltage Vm of the fuel injector 21 by the second low-pass filter. Further, the difference Vdiff (=Vsm1−Vsm2) between the first filter voltage Vsm1 and the second filter voltage Vsm2 is calculated.

After the voltage inflection point time Tdiff is reset to "0" at a timing (reference timing) t1 when the energization pulse is turned ON from OFF, the calculation of the voltage inflection point time Tdiff is started. Then, the processing of counting up the voltage inflection point time Tdiff is repeatedly performed at the specified period Ts.

Then, the calculation of the voltage inflection point time Tdiff is completed at a timing t2 when the difference Vdiff between the first filter voltage Vsm1 and the second filter voltage Vsm2 is more than the threshold value Vt after the energization pulse is turned OFF. In this way, the time which passes from the timing (reference timing) t1 when the energization pulse is turned ON from OFF until the timing t2 when the difference Vdiff is more than the threshold value Vt is calculated as the voltage inflection point time Tdiff.

The calculated value of the voltage inflection point time Tdiff is held until a next reference timing t3, and the engine microcomputer 112 acquires the voltage inflection point time Tdiff from the injector drive IC 113 within this period (a period from the timing t2 when the calculation of the voltage inflection point time Tdiff is completed until the next reference timing t3).

The ECU 30 (fuel injection control device) according to the present embodiment energizes the magnetic circuit 56 by the injector control part 31 by the specified energization pulse P2 within a range in which the needle valve 53 of the fuel injector 21 is not driven and stores the information (the magnetic circuit variation value in the present embodiment), which relates to the behavior of the drive voltage (minus terminal voltage Vm) of the fuel injector 21 at this time, in the storage part 33. On the drive voltage at the time of driving the fuel injector 21 are superimposed the induced electromotive force caused by the behavior of the armature (the behavior of the needle valve 53) of the fuel injector 21 and the variations caused by the individual difference of the magnetic circuit 56. According to the configuration described above, the information relating to the behavior of the drive voltage when the fuel injector 21 is not driven can be stored, so the effect of the induced electromotive force by the behavior of the armature of the fuel injector 21 is reduced and the information strongly affected by the degree of variation caused by the individual difference of the magnetic circuit 56 can be held. Hence, when the information is utilized, the degree of variation in the behavior of the drive voltage affected by the individual difference of the magnetic circuit 56 of the fuel injector 21 can be detected with high accuracy.

Further, the ECU 30 measures the behavior of the minus terminal voltage Vm when the magnetic circuit 56 is energized by the energization pulse by the calculation part 32 and calculates the magnetic circuit variation value, which shows the degree of variation in the behavior of the drive voltage by the effect of the magnetic circuit 56, by the calculation part 32 on the basis of the measured behavior of the minus terminal voltage Vm and stores the calculated magnetic circuit variation value as the information relating to the behavior of the drive voltage in the storage part 33. The injector control part 31 uses the injection pulse P1, which is corrected on the basis of the magnetic circuit variation value stored in the storage part 33, at the time of opening the fuel injector 21. In this configuration, the injection pulse P1 is corrected on the basis of the variations caused by the individual difference of the magnetic circuit 56 of the fuel injector 21 and each of the fuel injectors 21 is opened by the corrected injection pulse, so the effect of the variations caused by the individual difference of the magnetic circuit 56 of each of the fuel injectors 21 can be well reduced and hence control accuracy of opening each of the fuel injectors 21 can be improved.

Up to this point, the embodiment of the present disclosure has been described with reference to specific examples. However, the present disclosure is not limited to these specific examples. That is to say, an embodiment to which a person skilled in the art adds design changes to these specific examples as appropriate is included also in the scope of the present disclosure as far as they have features of the present disclosure. For example, each element provided in the respective specific examples described above and an arrangement, a material, a condition, a shape, and a size of the element are not limited to those exemplified but can be modified as appropriate. Further, the respective elements provided in each embodiment described above can be combined with each other as far as they can be technically combined, and an embodiment in which these elements are combined with each other is included in the scope of the present disclosure as far as the embodiment includes the features of the present disclosure.

In the embodiment described above is illustrated a configuration in which the magnetic circuit variation value is stored in the storage part as "the information relating to the behavior of the minus terminal voltage Vm (drive voltage)". However, information reflecting the behavior of the minus terminal voltage Vm only needs to be stored in the storage part and, for example, a configuration may be employed in which the time series data of the minus terminal voltage Vm is stored as it is, or a configuration may be employed in which information derived from the time series data of the minus terminal voltage such as the drive-voltage-behavior value (for example, the voltage inflection point time Tdiff) is stored.

In the embodiment described above, as a condition in which the calculation processing of the magnetic circuit variation value shown in the flow chart of FIG. 11 is illustrated a condition in which the operating state of the vehicle is the state in which fuel is being cut (see step S01 of FIG. 11). However, the present operating state of the vehicle only needs to be an operating state in which the fuel injector 21 is not driven and, for example, a configuration may be employed in which the calculation processing of the magnetic circuit variation value is performed before starting the engine 11 after an ignition is turned ON. Further, a configuration may also be employed in which the calculation processing of the magnetic circuit variation value is performed at the time of an operating state in which the fuel injector 21 is driven.

Further, in the embodiment described above, in the calculation processing of the magnetic circuit variation value shown in the flow chart of FIG. 11, a configuration is illustrated in which the ratio of the drive-voltage-behavior value V_fb of each of the fuel injectors 21 to the average value V_fb_Ave of these drive-voltage-behavior values V_fb is calculated as the magnetic circuit variation value (see step S07 of FIG. 11). However, the magnetic circuit variation value only needs to be a value to reflect a variance between the drive-voltage-behavior value V_fb of each of the fuel injectors 21 and the average value V_fb_Ave of them and, for example, a configuration may be employed in which a difference between the drive-voltage-behavior value V_fb of each of the fuel injectors 21 and the average value V_fb_Ave of them is calculated as the magnetic circuit variation value.

Similarly, a configuration may be employed in which a base value V_fb_base relating to the behavior of the drive voltage is set and in which a variance (ratio or difference) between the drive-voltage-behavior value V_fb of each of the fuel injectors 21 and the base value V_fb_base is calculated as the magnetic circuit variation value. In this case, a configuration may be employed in which the base value V_fb_base is a specified value set in advance or a configuration may be employed in which the base value V_fb_base is calculated by the use of a value obtained by filtering the measured behavior of the drive voltage by a filter.

Further, in the embodiment, a configuration is illustrated in which the minus terminal voltage Vm is measured as the drive voltage of the fuel injector 21. However, for example, a voltage value measured at another portion such as a plus terminal voltage of the drive coil 51 can be used as the drive voltage of the fuel injector 21.

Still further, in the embodiment described above, in the calculation processing of the magnetic circuit variation value shown in the flow chart of FIG. 11 is illustrated a configuration in which the target current value Cor_IP and the energization pulse width Cor_time of the energization pulse P2 are set on the basis of the present operating state of the engine 11. However, a configuration may be employed in which these values are specified values.

Still further, in the embodiment described above, a configuration is illustrated in which in the ECU 30, the injection pulse correction calculation part 34 of the engine control microcomputer 112 corrects the target pulse width Ti of the injection pulse (in other words, an energization time of each of the fuel injectors 21) according to the magnetic circuit variation value for each of the fuel injectors 21 stored in the storage part 33 and in which the injector control part 31 of the injector drive IC 113 energizes each of the fuel injectors 21 according to the corrected target pulse width (in other words, corrects the energization time to each of the fuel injectors 21 on the basis of the magnetic circuit variation value). However, the injection pulse may be corrected by other technique. For example, a configuration may be employed in which a detection value of the drive voltage such as the minus terminal voltage Vm when the fuel injector 21 is driven is corrected by the use of the magnetic circuit variation value for each of the fuel injectors 21 stored in the storage part 33 and in which the injection pulse is set on the basis of the corrected detection value of the drive voltage.

The present disclosure has been described in accordance with the embodiment thereof, but it is to be understood that the present disclosure is not limited to the embodiment and the configuration. The present disclosure intends to cover various modifications and variations which fall within an equivalent range of the present disclosure. In addition, various combinations and configurations and other combinations and configurations further including more, less or only a single element are also within the spirit and scope of the present disclosure.

The invention claimed is:

1. A fuel injection control device for an internal combustion engine which is provided with a fuel injector of an electromagnetic drive, the fuel injection control device comprising:
   a control part that energizes a magnetic circuit of the fuel injector by a specified injection pulse to open the fuel injector and that energizes the magnetic circuit by a specified energization pulse within a range in which a valve body of the fuel injector is not driven;
   a storage part that stores information relating to a behavior of a drive voltage of the fuel injector when the magnetic circuit is energized by the control part by the specified energization pulse; and
   a calculation part that measures the behavior of the drive voltage of the fuel injector when the magnetic circuit is energized by the control part by the specified energization pulse and that calculates a magnetic circuit variation value showing a degree of variation in the behavior by an effect of the magnetic circuit on the basis of the measured behavior of the drive voltage, wherein
   the storage part stores the magnetic circuit variation value calculated by the calculation part as the information relating to the behavior of the drive voltage, and
   when the control part opens the fuel injector, the control part uses the specified injection pulse which is corrected on the basis of the magnetic circuit variation value stored in the storage part.

2. The fuel injection control device for an internal combustion engine according to claim 1, wherein
   the drive voltage is a minus terminal voltage of the fuel injector.

3. The fuel injection control device for an internal combustion engine according to claim 1, wherein
   the specified energization pulse is set in a range in which the valve body of the fuel injector is not driven by regulating a target current value or an energization pulse width thereof.

4. The fuel injection control device for an internal combustion engine according to claim 3, wherein
   at least one of the target current value and the energization pulse width of the specified energization pulse is changed according to an operating state of the internal combustion engine.

5. The fuel injection control device for an internal combustion engine according to claim 4, wherein
   the target current value of the specified energization pulse is set higher as a control fuel pressure of the internal combustion engine is higher and is set lower as the control fuel pressure of the internal combustion engine is lower.

6. The fuel injection control device for an internal combustion engine according to claim 1, wherein
   the information relating to the behavior of the drive voltage is calculated from a value, which is obtained by smoothing the drive voltage by a filter when the magnetic circuit is energized by the control part by the specified energization pulse.

7. The fuel injection control device for an internal combustion engine according to claim 1, wherein
   when the control part opens the fuel injector, the control part corrects an energization time of the fuel injector on the basis of the information which relates to the behavior of the drive voltage and is stored in the storage part.

8. The fuel injection control device for an internal combustion engine according to claim 1, wherein
   when the control part opens the fuel injector, the control part corrects a detection value of the drive voltage on the basis of the information which relates to the behavior of the drive voltage and is stored in the storage part, and the control part sets the specified injection pulse on the basis of the corrected detection value.

9. The fuel injection control device for an internal combustion engine according to claim 1, wherein
   the storage part stores information relating to a behavior of a drive voltage after the specified energization pulse is turned off.

10. A fuel injection control device for an internal combustion engine which is provided with a fuel injector of an electromagnetic drive, the fuel injection control device comprising:
    a control part that energizes a magnetic circuit of the fuel injector by a specified injection pulse to open fuel injector and that energizes the magnetic circuit by a specified energization pulse within a range in which a valve body of the fuel injector is not driven; and
    a storage part that stores information relating to a behavior of a drive voltage of the fuel injector when the magnetic circuit is energized by the control part by the specified energization pulse:
    wherein the information relating to the behavior of the drive voltage includes a variance between a drive-voltage-behavior value calculated from the measured behavior of the drive voltage and an average value the individual drive-voltage-behavior values of the plurality of fuel injectors provided in the internal combustion engine.

11. The fuel injection control device for an internal combustion engine according to claim 10, wherein
    the variance is a ratio between both values.

12. The fuel injection control device for an internal combustion engine according to claim 10, wherein
    the variance is a difference between both values.

13. The fuel injection control device for an internal combustion engine according to claim 10, wherein
    the drive-voltage-behavior value is an index using time as a unit.

14. The fuel injection control device for an internal combustion engine according to claim 10, wherein
    the drive-voltage-behavior value is an index using voltage as a unit.

15. A fuel injection control device for an internal combustion engine which is provided with a fuel injector of an electromagnetic drive, the fuel injection control device comprising:

a control part that energizes a magnetic circuit of the fuel injector by a specified injection pulse to open the fuel injector and that energizes the magnetic circuit by a specified energization pulse within a range in which a valve body of the fuel injector is not driven; and a storage part that stores information relating to a behavior of a drive voltage of the fuel injector when the magnetic circuit is energized by the control part by the specified energization pulse, wherein the control part energizes the magnetic circuit by the specified energization pulse at the time of an operating range in which the fuel injector does not inject fuel; and the control part energizes the magnetic circuit by the specified energization pulse in a fuel-cut operation while the internal combustion engine is being driven.

16. A fuel injection control device for an internal combustion engine which is provided with a fuel injector of an electromagnetic drive, the fuel injection control device comprising:

a control part that energizes a magnetic circuit of the fuel injector by a specified injection pulse to open the fuel injector and that energizes the magnetic circuit by a specified energization pulse within a range in which a valve body of the fuel injector is not driven; and a storage part that stores information relating to a behavior of a drive voltage of the fuel injector when the magnetic circuit is energized by the control part by the specified energization pulse;

wherein the information relating to the behavior of the drive voltage includes a variance between a drive-voltage-behavior value calculated from the measured behavior of the drive voltage and a base value relating to the behavior of the drive voltage.

17. The fuel injection control device for an internal combustion engine according to claim 16, wherein
the base value is set in advance.

18. The fuel injection control device for an internal combustion engine according to claim 16, wherein
the base value is calculated by use of a value obtained by filtering the measured behavior of the drive voltage by a filter.

19. The fuel injection control device for an internal combustion engine according to claim 15, wherein
the control part energizes the magnetic circuit by the specified energization pulse before starting the internal combustion engine.

* * * * *